Apr. 3, 1923.
I. LINCOLN
RESILIENT WHEEL
Filed July 5, 1921
1,450,671
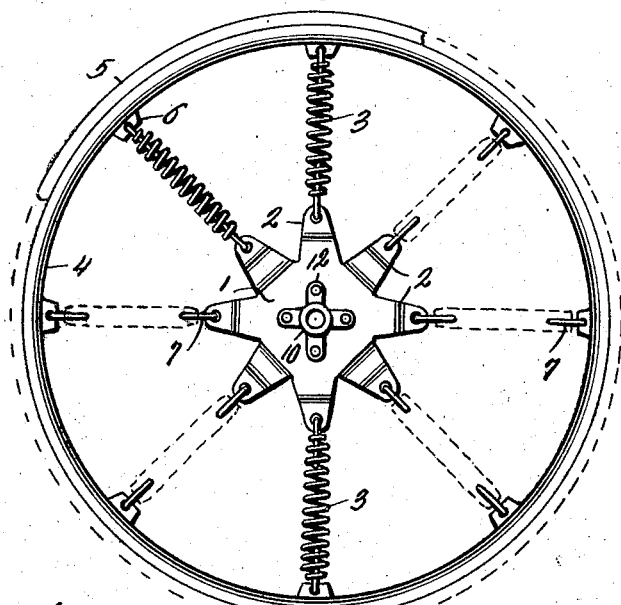
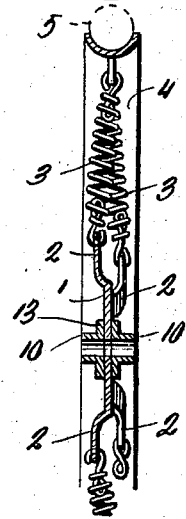
WITNESSES
IRVIN LINCOLN INVENTOR.
BY
ATTORNEY.

Patented Apr. 3, 1923.

1,450,671

UNITED STATES PATENT OFFICE.

IRVIN LINCOLN, OF LANSING, MICHIGAN.

RESILIENT WHEEL.

Application filed July 5, 1921. Serial No. 482,315.

*To all whom it may concern:*

Be it known that I, IRVIN LINCOLN, citizen of the United States, residing at Lansing, in the county of Ingham and State of Michigan, have invented certain new and useful Improvements in Resilient Wheels, of which the following is a specification.

This invention applies to resilient wheels and more particularly to wheels designed for use and connection with baby carriages, go-carts, and other structures of light character.

An important object of the invention is to provide a resilient wheel having a relatively movable hub and rim, and elastic cushioning elements between the hub and rim.

An additional object is to provide a resilient wheel having a yieldably supported rim connected to a hub member by elastic elements forming resilient spokes which spokes are disposed at an angle to the diametrical axis of the wheel for equally distributing the strain or load of the wheel.

With the above and other objects in view, the invention may be said to reside generally in the details of construction, combination and arrangement of parts as will be hereinafter more fully pointed out and described, reference being had to the accompanying drawings wherein:

Figure 1, is a side view of a wheel constructed in accordance with the invention; Figure 2, a sectional view of a fragment of the wheel, showing the manner of mounting the spokes and hub; and Figure 3, a detailed view of the spoke connection with the rim.

The invention is primarily intended to provide a resilient wheel for supporting light vehicles although it is obvious that the principles of the device may be applied in providing a resilient wheel of greater load-bearing capacity. The wheel is formed with a central disc 1 provided with an opening in the center to receive an axle. Integral with the peripheral edge of the disc and projecting outwardly therefrom in radial disposition with respect to the center of the disc are a plurality of spaced apart lugs 2. These lugs are arranged in staggered relation to one another and are accordingly disposed to project from opposite sides of the disc, and consequently, the center of the wheel. Connected to each lug is one end of a yieldable spoke element 3, preferably a coil spring as illustrated. These spokes are adapted to be connected to rim 4 which is concentric with disc 1 and faced outwardly therefrom as shown in Figure 1. This rim is concaved to receive a suitable tire 5 and is provided on its inner side, with depending lugs 6, about the rim so that there is a rim-lug opposite to every disc-lug. The lugs are adapted to be connected to the ends of the spring spokes 3 each by means of a hook 7. One end of hook 7 is curved to provide a knob 8, which is adapted to be received between and embraced by the convolutions of the spring spoke, the terminal coils of the latter being constricted about the hook above the knob to retain the same in firm engagement therewith, as indicated at 9. It will thus be seen that hooks 7 secure the spokes firmly to the rim and hub, while at the same time permitting their disconnection therefrom whenever desired. The staggered arrangement of lugs 2 tends to cause the springs to be supported at an angle with the diametrical axis of the rim as may be seen to advantage in Figure 2 of the drawings. Consequently, the strain from the rim of the wheels is uniformly distributed and equalized throughout the wheel so that no undue stress is imposed upon the hub-disc.

The hub proper of the wheel is made in two sections as indicated at 10 and 11, each section being fastened to the disc by rivets, bolts or other suitable fasteners 12, engaging the disc through the tongues or flanges 13 of the hub-sections. These sections are in alignment with the center opening of the disc as shown in Figure 2 of the drawings and provide a suitable hub support for the wheel whereby the latter may be readily mounted on an axle. Being yieldably supported by spring spokes 3 it is obvious that the hub is free to move relative to the rim, in accordance with the yielding of the supporting springs. Consequently, the load sustained by the wheel will be yieldably supported and more readily responsive to the shocks and jars incident to travel.

The foregoing description and accompanying drawings have reference to what might be considered to be the approved or preferred form of my invention. I desire it to be understood, however, that I may make such changes in the construction, combination and arrangement of parts, materials, dimensions, et cetera, as may prove expedient and fall within the scope of the appended claim.

Having thus described my invention, what I claim as new and desire to secure by Letters Patent is:

A resilient wheel comprising a rim, lugs provided with openings, said lugs being mounted in spaced relation on the inner surface of said rim, the hub disk having radially disposed lugs projecting outwardly from the peripheral edge thereof, said lugs being alternately disposed to extend on opposite sides of the disk, and spring spokes adapted to be connected to the hub disk lugs and the rim lugs, each of said spring spokes being provided with a hook formed from a single piece of material, one end of which is bent to form a knob which is adapted to be received between and embraced by the convolutions of the spring spoke, the internal coils of the spring spoke being constructed about the hook above the knob to retain the same in firm engagement therewith.

In testimony whereof I affix my signature in presence of two witnesses.

IRVIN LINCOLN.

Witnesses:
ANSON LONGSTREET,
J. R. MCCARTHY.